United States Patent
Akimoto et al.

(10) Patent No.: US 10,807,878 B2
(45) Date of Patent: Oct. 20, 2020

(54) PROTON-CONDUCTIVE COMPLEX OXIDE AND FUEL CELL USING SAME AS ELECTROLYTE

(71) Applicant: NATIONAL INSTITUTE OF ADVANCED INDUSTRIAL SCIENCE AND TECHNOLOGY, Tokyo (JP)

(72) Inventors: Junji Akimoto, Tsukuba (JP); Naoki Hamao, Tsukuba (JP); Kunimitsu Kataoka, Tsukuba (JP)

(73) Assignee: NATIONAL INSTITUTE OF ADVANCED INDUSTRIAL SCIENCE AND TECHNOLOGY, Tokyo (JP)

(*) Notice: Subject to any disclaimer, the term of this patent is extended or adjusted under 35 U.S.C. 154(b) by 0 days.

(21) Appl. No.: 15/753,904

(22) PCT Filed: Aug. 19, 2016

(86) PCT No.: PCT/JP2016/074254
§ 371 (c)(1),
(2) Date: Feb. 20, 2018

(87) PCT Pub. No.: WO2017/033865
PCT Pub. Date: Mar. 2, 2017

(65) Prior Publication Data
US 2018/0179080 A1    Jun. 28, 2018

(30) Foreign Application Priority Data
Aug. 21, 2015   (JP) ................. 2015-164120

(51) Int. Cl.
*H01M 8/00*   (2016.01)
*C01G 33/00*   (2006.01)
(Continued)

(52) U.S. Cl.
CPC ......... *C01G 33/003* (2013.01); *C01G 25/006* (2013.01); *C01G 33/006* (2013.01);
(Continued)

(58) Field of Classification Search
CPC ....... H01M 8/12; H01M 4/88; C01P 2002/30; C01G 35/006; C01G 35/003
See application file for complete search history.

(56) References Cited

U.S. PATENT DOCUMENTS

2014/0170465 A1* 6/2014 Visco .................. H01G 11/06
                                                         429/144

OTHER PUBLICATIONS

Liu et al. "Reversible ion Exchange and Structural Stability of Garnet-Type Nb-Doped Li7La3Zr2o12 in Water for Applications in Lithium Batteries"; Journal of Power Sources. vol. 282 (Year: 2015).*

(Continued)

*Primary Examiner* — Cynthia H Kelly
*Assistant Examiner* — Monique M Wills
(74) *Attorney, Agent, or Firm* — Studebaker & Brackett PC

(57) ABSTRACT

Provided is a complex oxide that has a space group I-43d, has a high hydrogen content, contains almost no impurity phase, exhibits almost no aluminum substitution in the structure thereof, and is suitable for proton conductivity. This complex oxide is represented by a chemical formula $Li_{7-x-y}H_xLa_3Zr_{2-y}M_yO_{12}$ (M represents Ta and/or Nb, $3.2 < x \leq 7-y$, and $0.25 < y < 2$) and is a single phase of a garnet type structure belonging to a cubic system, and the crystal structure thereof is a space group I-43d.

4 Claims, 13 Drawing Sheets

(51) Int. Cl.
*C01G 25/00* (2006.01)
*H01M 8/1246* (2016.01)
*H01M 8/12* (2016.01)
*H01M 4/88* (2006.01)
*C01G 35/00* (2006.01)

(52) U.S. Cl.
CPC ......... *C01G 35/003* (2013.01); *C01G 35/006* (2013.01); *H01M 4/88* (2013.01); *H01M 8/12* (2013.01); *H01M 8/1246* (2013.01); *C01P 2002/30* (2013.01); *C01P 2006/40* (2013.01); *H01M 2300/0074* (2013.01); *Y02E 60/50* (2013.01); *Y02P 70/50* (2015.11)

(56) References Cited

OTHER PUBLICATIONS

Liu et al. Garnet-type Li6.4La3Zr1.4Ta0.6)12 thin sheet: Fabrication and Application. Sep. 2014 (Year: 2014).*

International Search Report issued in PCT/JP2016/074254; dated Sep. 20, 2016.

International Preliminary Report on Patentability and Written Opinion issued in PCT/JP2016/074254; dated Feb. 27, 2018.

Cai Liu et al.; "Reversible Ion Exchange and Structural Stability of Garnet-Type Nb-Doped Li7La3Zr2O12 in Water for Applications in Lithium Batteries"; Journal of Power Sources; Feb. 9, 2015; pp. 286-293; vol. 282.

Yutao Li et al.; "The Reaction of Li6.5La3Zr1.5Ta0.5O12 with Water"; Solid State Ionics; Nov. 28, 2015; pp. 57-61; vol. 269.

Kai Liu et al., "Garnet-type Li6.4La3Zr1.4Ta0.6O12 thin sheet: Fabrication and application in lithium-hydrogen peroxide semi-fuel cell", Electrochemistry Communications, vol. 48, Sep. 16, 2014, pp. 147-150.

Lina Truong et al., "Facile proton conduction in H+/Li+ ion-exchanged garnet-type fast Li-ion conducting Li5La3Nb2O12", Journal of Materials Chemistry A, Oct. 4, 2013, vol. 1, pp. 13469-13475.

* cited by examiner

PROTON-CONDUCTIVE COMPLEX OXIDE AND FUEL CELL USING SAME AS ELECTROLYTE

TECHNICAL FIELD

The present invention relates to a complex oxide having high proton conductivity and a fuel cell using the complex oxide as an electrolyte.

BACKGROUND ART

As a proton-conductive complex oxide for use in a fuel cell, $Li_{1.7}H_{5.05}La_3Nb_{0.25}Zr_{1.75}O_{12}$ has been known (Non-Patent Document 1). $Li_{1.7}H_{5.05}La_3Nb_{0.25}Zr_{1.75}O_{12}$ is prepared by washing $Li_{6.75}La_3Nb_{0.25}Zr_{1.75}O_{12}$ having good lithium conductivity with water, subjecting the complex oxide to vacuum drying, and repeatedly subjecting the complex oxide to an annealing treatment at 150° C. However, regarding the crystal structure of $Li_{1.7}H_{5.05}La_3Nb_{0.25}Zr_{1.75}O_{12}$, only the lattice constant has been reported and a correlation between a hydrogen amount and proton conductivity has not been clarified.

In addition, Non-Patent Document 2 discloses that lithium can be substituted by hydrogen by washing $Li_{6.75}La_3Ta_{0.25}Zr_{1.75}O_{12}$ with water at room temperature. However, the amount of substitution to hydrogen is as small as 21% of the amount of lithium and the space group is still Ia-3d which is suitable for lithium conduction. In the first place, it has been well known that a single phase sample cannot be synthesized in a case where aluminum is not substituted in a lithium site in $Li_{6.75}La_3M_{0.25}Zr_{1.75}O_{12}$ (M represents Ta or Nb). Therefore, a single phase $Li_{6.75}La_3M_{0.25}Zr_{1.75}O_{12}$ (M represents Ta or Nb) is a complex oxide which is not suitable as a proton conductor since it is predicted that aluminum inhibits a proton conduction pass. In addition, it is known that the substituted aluminum is precipitated in the form of aluminum hydroxide at the time of exchange of lithium and proton. The precipitated aluminum hydroxide causes a reduction in strength of an electrolyte material.

CITATION LIST

Non-Patent Document

Non-Patent Document 1: C. Liu, K. Rui, C. Shen, M. E. Badding, G. Zhang, Z. Wen, Journal of Power Sources, 282 (2015) p. 286-293
Non-Patent Document 2: Y. Li, J.-T. Han, S. V. Vogel, C.-A. Wang, Solid State Ionics, 269 (2015) p. 57-61

SUMMARY

Technical Problem

The present invention is made in consideration of such circumstances and an object thereof is to provide a complex oxide having high proton conductivity.

Solution to Problem

The present inventors have found that a proton-conductive complex oxide can be obtained by subjecting a substitution type garnet type lithium ion conductor oxide having excellent lithium ion conductivity and not having aluminum mixed therein to a proton exchange treatment with a solution of a substance having a hydroxy group or a carboxy group at 80° C. or higher. This proton-conductive complex oxide is represented by a chemical formula $Li_{7-x-y}H_xLa_3Zr_{2-y}M_yO_{12}$ (M represents at least one of Ta and Nb, $3.2 < x \leq 7-y$, and $0.25 < y < 2$), has a garnet type structure, has no precipitation of lanthanum hydroxide as an impurity phase, and adopts I-43d which is a space group suitable for proton conduction or the like. It has been confirmed that a fuel cell system using the proton-conductive complex oxide as an electrolyte material can generate electric power and thus the present invention has been completed.

A complex oxide of the present invention is represented by a chemical formula $Li_{7-x-y}H_xLa_3Zr_{2-y}M_yO_{12}$ (M represents Ta and/or Nb, $3.2 < x \leq 7-y$, and $0.25 < y < 2$) and is a single phase of a garnet type structure belonging to a cubic system. A proton conductor of the present invention contains the complex oxide of the present invention. A fuel cell of the present invention includes a fuel electrode, an air electrode, and a solid electrolyte containing the proton conductor of the present invention.

A method for producing a complex oxide of the present invention includes an exchange step of bringing a raw material complex oxide represented by a chemical formula $Li_{7-x-y}H_xLa_3Zr_{2-y}M_yO_{12}$ (M represents Ta and/or Nb, $0 \leq x \leq 3.2$, and $0.25 < y < 2$) and a compound having a hydroxy group or a carboxy group into contact with each other to exchange at least some of lithium of the raw material complex oxide and hydrogen of the compound having a hydroxy group or a carboxy group.

Advantageous Effects of Invention

According to the present invention, it is possible to obtain a complex oxide that is useful as a proton conductor.

DESCRIPTION OF EMBODIMENTS

Figure 1:
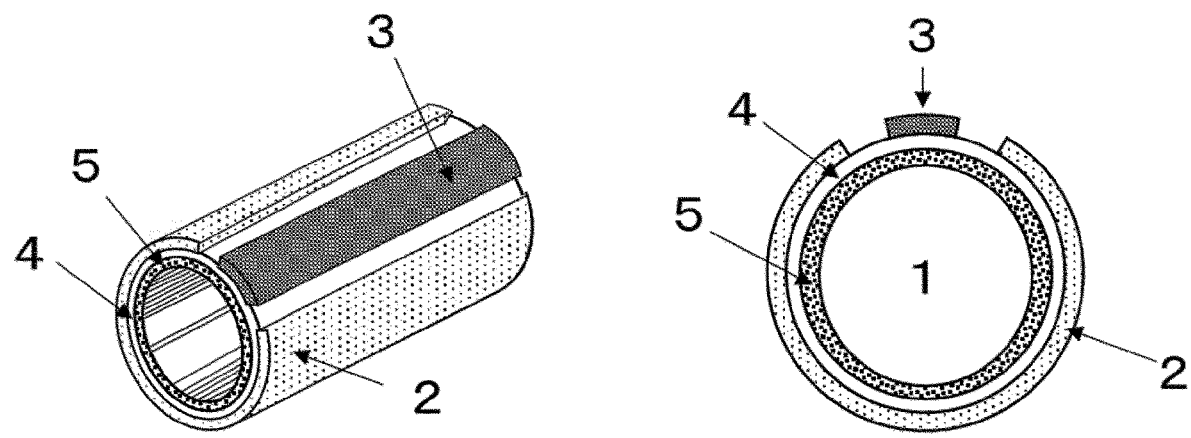
FIG. 1 is a schematic view showing an example of a fuel cell.

The present inventors have conducted intensive investigations on a production method for increasing a hydrogen content in a proton conductor having a garnet type structure by further advancing a proton exchange reaction, and a space group of a crystal structure of a cubic system exhibiting good proton conductivity. As a result thereof, it has been found that a complex oxide $Li_{7-x-y}H_xLa_3Zr_{2-y}M_yO_{12}$ (M represents Ta and/or Nb, $3.2<x\leq7-y$, and $0.25<y<2$) in which some of zirconium of a lithium hydrogen lanthanum zirconium complex oxide having a garnet type structure is substituted by tantalum and/or niobium can be produced, and electric power can be generated by an intermediate temperature operation type fuel cell system using this complex oxide as an electrolyte.

Particularly, the cubic system space group becomes I-43d by optimizing the crystal structure and lithium does not occupy the proton conduction path of the crystal structure. Thus, a crystal structure suitable for proton conduction is obtained. Here, the space group being I-43d can be confirmed by observing peaks with indexes 310, 530, 710, 730, and the like in powder X-ray diffraction measurement. That is, in a case where the space group is Ia-3d, these peaks are not observed in principle from the extinction rule.

As a result, compared to a proton conductor having a cubic system space group Ia-3d having a known garnet type structure, the complex oxide $Li_{7-x-y}H_xLa_3Zr_{2-y}M_yO_{12}$ (M represents Ta and/or Nb, $3.2<x\leq7-y$, and $0.25<y<2$) of the present invention has a high hydrogen content. In addition, good proton conductivity can be confirmed with a solid electrolyte containing the complex oxide of the present invention and thus the present invention has been completed.

Hereinafter, a complex oxide, a proton conductor, a fuel cell, and a method for producing a complex oxide of the present invention will be described based on embodiments and examples. It is to be noted that the overlapping description will be omitted as appropriate. In addition, in a case where the term "to" is used between two numerical values to represent a numerical range, these two numerical values are also included in the numerical range.

A complex oxide according to an embodiment of the present invention is represented by a chemical formula $Li_{7-x-y}H_xLa_3Zr_{2-y}M_yO_{12}$ (M represents Ta and/or Nb, $3.2<x\leq7-y$, and $0.25<y<2$), and is a single phase of a garnet type structure belonging to a cubic system. The crystal structure of the complex oxide of the embodiment is a space group I-43d. A proton conductor according to an embodiment of the present invention contains the complex oxide of the embodiment.

A method for producing the complex oxide according to the embodiment of the present invention includes an exchange step of bringing a raw material complex oxide represented by $Li_{7-x-y}H_xLa_3Zr_{2-y}M_yO_{12}$ (M represents Ta and/or Nb, $0\leq x\leq3.2$, $0.25<y<2$) and a compound having a hydroxy group or a carboxy group into contact with each other to exchange at least some of lithium of the raw material complex oxide and hydrogen of the compound having a hydroxy group or a carboxy group. Water is not included in the compound having a hydroxy group.

The raw material complex oxide can be produced by weighing and mixing a lithium raw material, a zirconium raw material, a lanthanum raw material, and a tantalum raw material and/or niobium raw material such that the chemical composition is $Li_{7-x-y}H_xLa_3Zr_{2-y}M_yO_{12}$ (M represents Ta and/or Nb, $0\leq x\leq3.2$, and $0.25<y<2$), and heating the mixture in an atmosphere in which an oxygen gas is present, such as in air. The lithium raw material is at least one of metal lithium and a lithium compound. The zirconium raw material is at least one of metal zirconium and a zirconium compound. The lanthanum raw material is at least one of metal lanthanum and a lanthanum compound. The tantalum raw material is at least one of metal tantalum and a tantalum compound. The niobium raw material is at least one of metal niobium and a niobium compound.

The raw material complex oxide may be produced by weighing and mixing compounds formed of two or more of lithium, lanthanum, zirconium, and tantalum and/or niobium such that the chemical composition is $Li_{7-x-y}H_xLa_3Zr_{2-y}M_yO_{12}$ (M represents Ta and/or Nb, $0\leq x\leq3.2$, and $0.25<y<2$), and heating the mixture in an atmosphere in which an oxygen gas is present, such as in air.

The lithium compound is not particularly limited as long as the compound contains lithium. Examples thereof include $Li_2CO_3$, $LiOH.H_2O$, $LiNO_3$, $LiCl$, $Li_2SO_4$, $Li_2O$, and $Li_2O_2$. In addition, compounds formed of lithium lanthanum oxides such as $LiLaO_2$, lithium zirconium oxides such as $Li_2ZrO_3$, lithium tantalum oxides such as $LiTaO_3$, lithium niobium oxides such as $LiNbO_3$, or the like may be used as the lithium compound. Among these, the lithium raw material is preferably a lithium carbonate $Li_2CO_3$ or the like.

The lanthanum compound is not particularly limited as long as the compound contains lanthanum. Examples thereof include $La_2O_3$, $La_2(CO_3)_3$, and $La(NO_3)_3.6H_2O$. Among these, a lanthanum oxide $La_2O_3$ or the like is preferable. The zirconium compound is not particularly limited as long as the compound contains zirconium. Examples thereof include $ZrCl_4$ and $ZrO_2$.

In addition, examples of the zirconium compound include lanthanum zirconium oxides such as $La_2Zr_2O_7$. The zirconium compound frequently contains hafnium which is difficult to separate. However, even in a case where about 2 weight % hafnium is mixed in zirconium, the hafnium occupies the compound by substitution by the zirconium site, and thus a finally obtained complex oxide does not have any problem in performance as a proton conductor.

The tantalum compound is not particularly limited as long as the compound contains tantalum. Examples thereof include $Ta_2O_5$ and $TaCl_5$. Among these, $Ta_2O_5$ or the like is preferable. The niobium compound is not particularly limited as long as the compound contains niobium. Examples thereof include $Nb_2O_5$ and $NbCl_5$. Among these, $Nb_2O_5$ or the like is preferable.

A specific method for producing the raw material complex oxide is as follows. First, a mixture including a lithium raw material, a zirconium raw material, a lanthanum raw material, and a tantalum raw material and/or a niobium raw material is prepared. Lithium, zirconium, lanthanum, and tantalum and/or niobium are preferably mixed such that the chemical composition is $Li_{7-y}La_3Zr_{2-y}M_yO_{12}$ (M represents Ta and/or Nb, and $0.25<y<2$). As long as each raw material can be uniformly mixed, the mixing method is not particularly limited and for example, the raw materials may be mixed in a wet or dry method using a known mixing machine such as a mixer.

Next, the mixture is put into a firing vessel and fired. In a case of using an alumina firing vessel, aluminum is mixed in the mixture and thus this case is not preferable. Accordingly, for the purpose of obtaining a good proton conductor, a non-alumina-based ceramic firing vessel or the like is preferably used and an yttrium stabilized zirconia (YSZ) firing vessel or the like is preferably used. The firing temperature can be appropriately set according to the raw material and the highest temperature is preferably about 900° C. to 1200° C. and more preferably about 950° C. to 1150° C. The firing atmosphere is not particularly limited, and firing may be typically carried out in an oxidizing atmosphere or in air.

In addition, in a case in which the time for firing at a high temperature is long or in a case where the number of times of firing is large, lithium volatilizes at a high temperature and thus the amount of lithium in the chemical composition is reduced. In such a case, it is preferable to use a mixture in which the amount of lithium has been excessively set to 30 mol % or less in advance compared to the desired compositional ratio of $Li_{7-y}La_3Zr_{2-y}M_yO_{12}$ (M represents Ta and/or Nb, and $0.25<y<2$). The firing time can be appropriately changed according to the firing temperature or the like. A cooling method is not particularly limited and typically, natural cooling (cooling in the furnace) or slow cooling may be used. After firing, if necessary, the fired material is pulverized by a known method and while changing the highest temperature, firing may be further carried out again one or two times. The degree of pulverization may be appropriately controlled according to the firing temperature or the like.

Through the exchange step of bringing the raw material complex oxide $Li_{7-x-y}H_xLa_3Zr_{2-y}M_yO_{12}$ (M represents Ta and/or Nb, $0 \leq x \leq 3.2$, and $0.25<y<2$) thus obtained and the compound having a hydroxy group or a carboxyl group into contact with each other to exchange at least some of lithium of the raw material complex oxide and hydrogen of the compound having a hydroxy group or a carboxyl group, a complex oxide represented by a chemical formula $Li_{7-x-y}H_xLa_3Zr_{2-y}M_yO_{12}$ (M represents Ta and/or Nb, $3.2<x \leq 7-y$, and $0.25<y<2$) is obtained. According to the production method, formation of lanthanum hydroxide can be suppressed and thus a garnet type proton conductor of a single phase can be prepared. In addition, the hydrogen content of the complex oxide can be maximized by reliably advancing the hydrogen exchange reaction.

Examples of the compound having a hydroxy group include aqueous compounds or non-aqueous compounds. Examples of aqueous compounds having a hydroxy group include an acidic aqueous solution including a compound having a hydroxy group and pure water (ion exchange water). Pure water (ion exchange water) is preferable. Examples of non-aqueous compounds having a hydroxy group include organic compounds having a hydroxy group, and for example, alcohols may be used. Among alcohols, primary alcohols are desirable and for example, methanol, ethanol, 1-propanol, 1-butanol, 1-hexanol, 1-heptanol, and the like may be used. Among these, methanol or ethanol having a low boiling point is particularly preferable. The compound having a carboxy group is not particularly limited as long as the compound is an organic acid compound having a carboxy group. Preferably, carboxylic acid is desirable, and examples thereof include benzoic acid, phthalic acid, acetic acid, and formic acid.

The temperature in the exchange step (hereinafter, referred to as "exchange temperature" in some cases) can be set from the viewpoint of the boiling point of the aqueous compound or non-aqueous compound having a hydroxy group or a carboxy group to be used and the ion exchange rate. The exchange temperature is preferably, for example, 80° C. or higher, more preferably 100° C. or higher, and even more preferably 120° C. or higher. The exchange temperature is desirably 200° C. or lower from the viewpoint of suppressing volatilization of the solvent as much as possible. The reaction time in the exchange step (hereinafter, referred to as "exchange time" in some cases) can be appropriately changed according to the kind and amount of the aqueous compound or non-aqueous compound having a hydroxy group or a carboxyl group to be used. The exchange time is preferably 12 hours or longer and more preferably 100 hours or longer to further advance the exchange reaction.

A method for maintaining the exchange temperature (hereinafter, referred to as a "heating method" in some cases) is not particularly limited as long as the method is a method for carrying out heating while suppressing volatilization of the solvent of the aqueous compound or non-aqueous compound. As the heating method, for example, heating using a circulating tube provided with a cooling device or continuous heating capable of handling an exchange step in an airtight vessel or an exchange step in a supercritical state, or the like is preferable. As the heating method, a method for heating a beaker made of PTFE in an autoclave made of SUS or the like is more preferable. After heating, the temperature is decreased to room temperature and then the material is sufficiently washed with the solvent used for reaction and followed by washing with water or ethanol. The material is finally sufficiently dried at about 60° C. to obtain a complex oxide. At this time, in order to remove extra lithium, a step for washing with water may be further added.

A fuel cell according to an embodiment of the present invention is obtained by using $Li_{7-x-y}H_xLa_3Zr_{2-y}M_yO_{12}$ (M represents Ta and/or Nb, $3.2<x \leq 7-y$, and $0.25<y<2$) as an electrolyte material. Except that the complex oxide of the embodiment is used as a solid electrolyte ceramic material, a cell element of a known intermediate temperature operation type fuel cell (of plate type, cylindrical type, cylindrical plate type, or the like) can be adopted as it is. Examples of the intermediate temperature operation type fuel cell include a solid polymer fuel cell, a phosphoric acid fuel cell, a molten salt fuel cell, a solid oxide fuel cell, an alkali electrolyte fuel cell, a direct fuel cell, a bio fuel cell, and the like.

FIG. 1 shows a fuel cell 1 in which the fuel cell according to the embodiment of the present invention is applied to a cylindrical type solid oxide fuel cell. The fuel cell 1 includes a fuel electrode 2, an interconnector 3, a solid electrolyte 4, and an air electrode 5. For the fuel electrode 2, the interconnector 3, and the air electrode 5, members constituting a known plate type, cylindrical type, or cylindrical plate type solid oxide fuel cell can be adopted as they are. The solid electrolyte 4 includes a proton conductor containing the complex oxide $Li_{7-x-y}H_xLa_3Zr_{2-y}M_yO_{12}$ (M represents Ta and/or Nb, $3.2<x \leq 7-y$, and $0.25<y<2$) of the embodiment.

The complex oxide of the embodiment is produced in the form of powder. Therefore, in order to use the complex oxide of the embodiment for the solid electrolyte, a press molding technique, a coating technique, a film formation technique, or the like is applied to obtain a molded body. Examples of the press molding technique include a sintering molding method, a pressure molding method, and an electric pressure sintering method. Examples of the coating technique include a screen printing method, an electrophoresis (EPD) method, a doctor blade method, a spray coating method, an ink jet method, and a spin coating method. Examples of the film formation technique include a vapor deposition method, a sputtering method, a chemical vapor deposition (CVD) method, an electrochemical vapor phase growth method, an ion beam method, a laser ablation method, an atmospheric pressure plasma film formation method, a reduced pressure plasma film formation method, and a composite film formation method.

As the material for the fuel electrode, a mixture of a metal catalyst and a ceramic powder material formed of a proton conductor can be used. As the metal catalyst, noble metals stable in a reducing atmosphere and having hydrogen oxidation activity, such as nickel, iron, cobalt, platinum, ruthenium, or palladium can be used. In addition, as the proton conductor, the complex oxide of the embodiment can be used but in addition to the complex oxide, $Ba(Zr,Y)O_3$, $Sr(Zr,Y)O_3$, $Ba(Ce,Y)O_3$, a phosphate-based proton-conductive oxide, and the like can be used. The mixed state of the metal catalyst and the ceramic powder material formed of the proton conductor may be a physically mixed state or may be powder modification to the metal catalyst or metal catalyst modification to the ceramic material.

As the material for the air electrode, a known powder ceramic material as the material for an air electrode of a solid oxide fuel cell can be used. For example, metal oxides of Co, Fe, Ni, Cr, and Mn having a perovskite structure or the like can be used. Specifically, oxides such as $(Sm,Sr)CoO_3$, $(La,Sr)MnO_3$, $(La,Sr)CoO_3$, $(La,Sr)(Fe,Co)O_3$, and $(La,Sr)(Fe,Co,Ni)O_3$ may be used. Among these, $(La,Sr)(Fe,Co)O_3$ is preferable. These ceramic materials may be used alone or as a mixture of two or more thereof.

EXAMPLES

In the following, examples will be shown for further clarifying the features of the present invention. The present invention is not limited to the examples.

Example 1

Synthesis of Raw Material Complex Oxide $Li_{6.5}La_3Zr_{1.5}Ta_{0.5}O_{12}$

Each of raw material powders of lithium carbonate ($Li_2CO_3$, manufactured by RARE METALLIC Co., Ltd., purity: 99.99%), lanthanum oxide ($La_2O_3$, manufactured by RARE METALLIC Co., Ltd., purity: 99.99%), zirconium oxide ($ZrO_2$, manufactured by RARE METALLIC Co., Ltd., purity: 99.99%), and tantalum oxide ($Ta_2O_5$, manufactured by RARE METALLIC Co., Ltd., purity: 99.99%) was weighed such that the substance amount ratio (molar ratio) became Li:La:Zr:Ta=8.45:3:1.5:0.5. Each raw material powder was mixed in ethanol using a planetary ball mill (P-7 type, manufactured by FRITCH) and a zirconia ball at 350 rpm for 100 minutes. The mixed powder and ethanol were separated from each other and then was put into an alumina crucible (grade SSA-S, model No. C3, manufactured by NIKKATO CORPORATION), followed by heating in air at 850° C. for 3 hours using a muffle furnace (FP310, manufactured by Yamato Scientific Co., Ltd.). Thereafter, the obtained calcined powders were mixed and pulverized in ethanol using a planetary ball mill and a zirconia ball at 300 rpm for 100 minutes.

Figure 2:
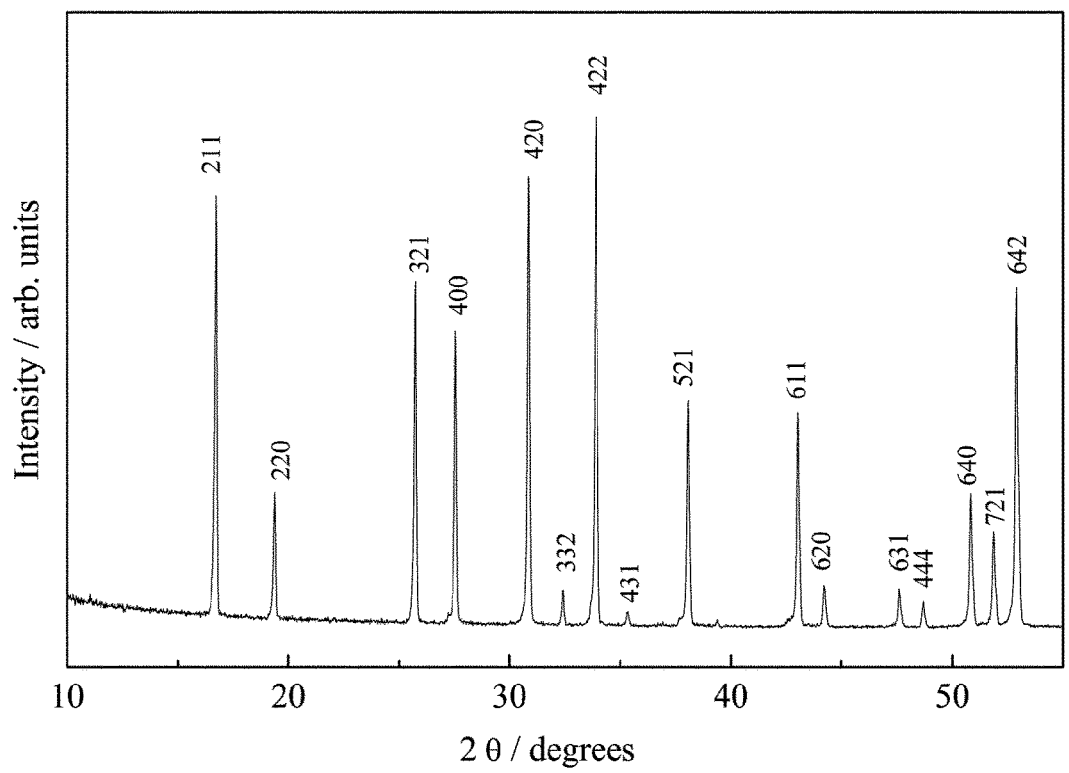
FIG. 2 is a powder X-ray diffraction chart of a raw material complex oxide $Li_{6.5}La_3Zr_{1.5}Ta_{0.5}O_{12}$ obtained in Example 1.

The obtained powder was pressed into pellets having a diameter φ of 10 mm using a uniaxial molding machine at 60 MPa. Then, the pressed body was put into a YSZ-3Y crucible and heated in air at 1150° C. for 4 hours using a high temperature box furnace (KBF524N1, manufactured by Koyo Thermo Systems Co., Ltd.) to obtain a raw material complex oxide $Li_{6.5}La_3Zr_{1.5}Ta_{0.5}O_{12}$. A powder X-ray diffraction apparatus (trade name: SmartLab (the same was applied except Comparative Example 1), manufactured by Rigaku Corporation) was used to investigate the crystal structure of the raw material complex oxide. It was confirmed that the raw material complex oxide has good crystallinity and is a single phase of a garnet type structure belonging to a space group Ia-3d which is a known cubic system. This powder X-ray diffraction chart is shown in FIG. 2.

Synthesis and Evaluation of Complex Oxide $Li_{0.89}H_{5.66}La_3Zr_{1.5}Ta_{0.5}O_{12}$ 1 g of the raw material complex oxide $Li_{6.5}La_3Zr_{1.5}Ta_{0.5}O_{12}$ powder synthesized above and 20 mL of anhydrous ethanol (guaranteed grade reagent, manufactured by Wako Pure Chemical Industries, Ltd.) were put into a PTFE beaker having an internal volume of 100 mL, and the beaker was set in a SUS pressure vessel. The SUS pressure vessel was put into a dryer and held at a highest temperature of 120° C. for 120 hours. Thereafter, cooling was carried out, the product was washed with ethanol, and then only the powder was taken out. Then, the powder was dried in air at 60° C. to collect a powder sample of the complex oxide.

Figure 3:
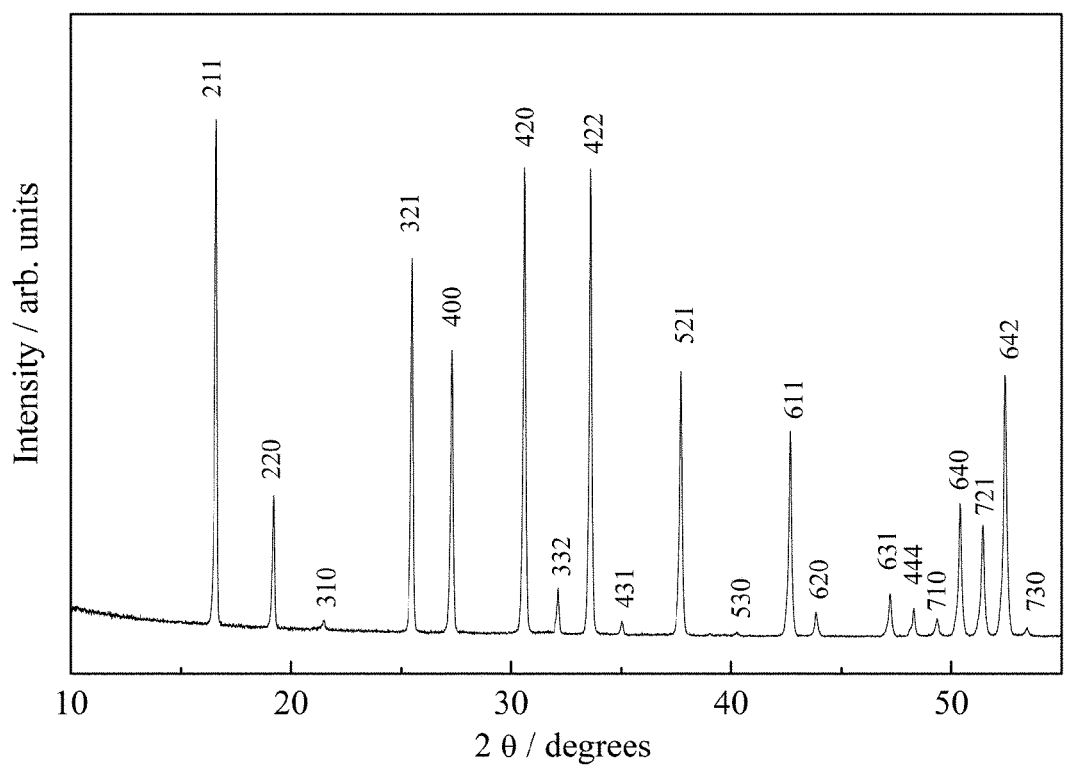
FIG. 3 is a powder X-ray diffraction chart of a complex oxide $Li_{0.89}H_{5.66}La_3Zr_{1.5}Ta_{0.5}O_{12}$ obtained in Example 1 that is indexed by a cubic system space group I-43d.

The crystal structure of the obtained complex oxide was investigated using a powder X-ray diffraction apparatus. It was confirmed that the complex oxide is a single phase of a garnet type structure having good crystallinity. The powder X-ray diffraction chart is shown in FIG. 3. As a result of carrying out refinement of the lattice constant of a cubic system which is the average structure by the least squares method, it was confirmed that the length of an a-axis of the cubic system is determined as 13.0443(1) Å and the complex oxide holds a garnet type structure from the lattice constant.

In addition, as shown in FIG. 3, new peaks that are not able to be indexed with a known space group Ia-3d were observed near 22°, 41°, 49°, and 53°. These peaks can be respectively indexed by indexes 310, 530, 710, and 730 with the space group I-43d of the same cubic system. It was confirmed that the complex oxide obtained in the example has a new crystal structure which has not been reported.

Figure 4:
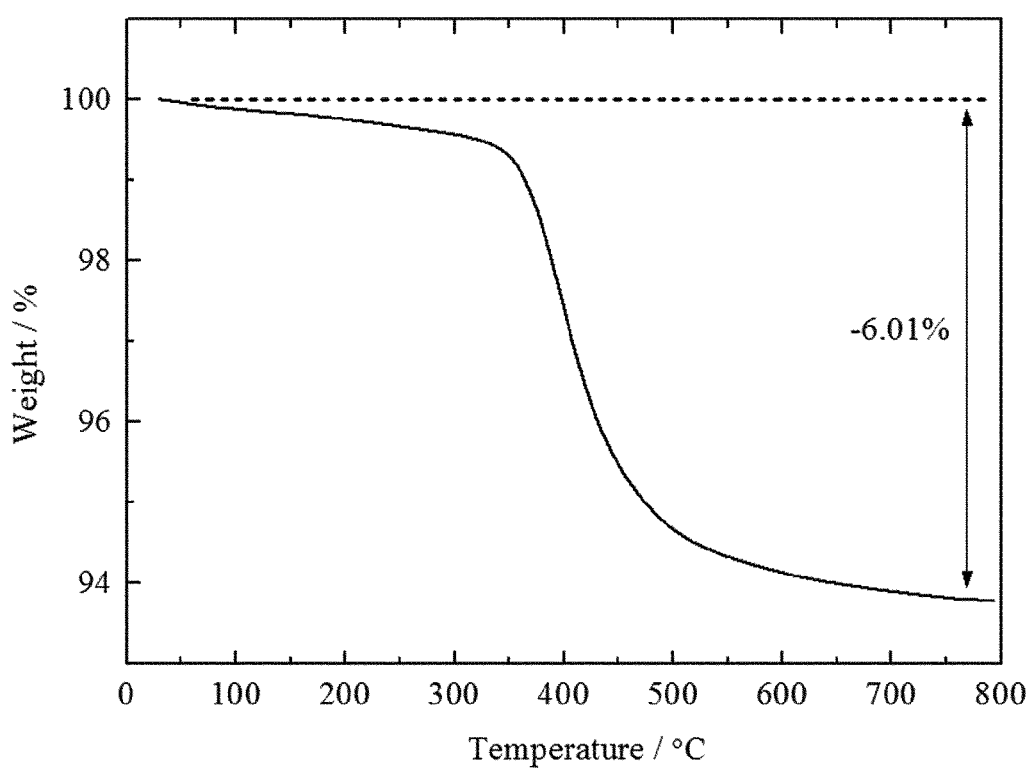
FIG. 4 is a graph showing a change in thermal weight of the complex oxide $Li_{0.89}H_{5.66}La_3Zr_{1.5}Ta_{0.5}O_{12}$ obtained in Example 1.

Next, using a simultaneous thermogravimetric and differential thermal analytic measurement device (EXSTAR TG/DTA7200, manufactured by SII Nano Technology Inc. Ltd.), the thermal analysis of the complex oxide was carried out at a temperature rising rate of 10° C./min in a temperature range of 20° C. to 800° C. in a dry air atmosphere. The thermogravimetric (TG) curve is shown in FIG. 4. A weight reduction from 20° C. to 800° C. was 6.01 wt %. Assuming that the weight reduction is caused by volatilization of hydrogen included in the complex oxide in the form of $H_2O$, the chemical formula of the complex oxide could be calculated as $Li_{0.89}H_{5.66}La_3Zr_{1.5}Ta_{0.5}O_{12}$. In the method of the example, it was confirmed that a large number of lithium ions included in the raw material complex oxide are exchanged for hydrogen.

In addition, the powder sample was molded into pellets having a diameter Φ of 10 mm at a pressure of 60 MPa to prepare a solid electrolyte and Au was sputtered onto both surfaces of the solid electrolyte with a diameter Φ of 7 mm to form blocking electrodes. The conductivity of the solid electrolyte was measured under the conditions at a frequency of 32 MHz to 100 Hz and an amplitude voltage of 100 mV using a frequency response analyzer (FRA) (1260 type, manufactured by Solatron Co., Ltd.). Then, a resistant value was obtained from the arc of a Nyquist plot and the conductivity was calculated from the resistant value.

Figure 5:
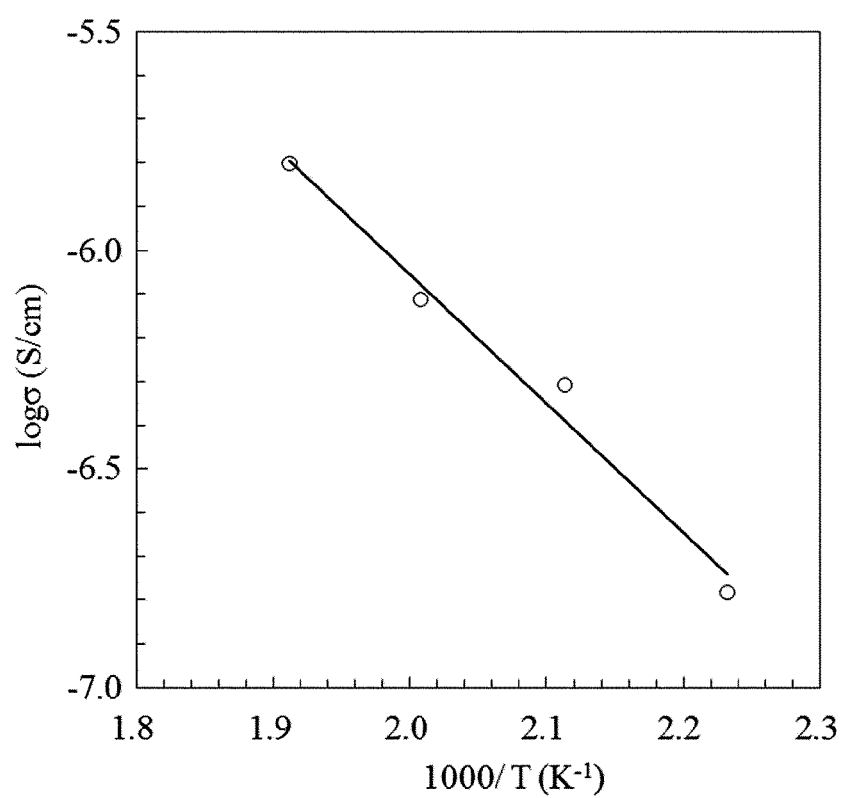
FIG. 5 is a graph showing the temperature dependency of the conductivity of a solid electrolyte prepared from the complex oxide $Li_{0.89}H_{5.66}La_3Zr_{1.5}Ta_{0.5}O_{12}$ obtained in Example 1.

Further, the solid electrolyte was heated to 150° C. to 250° C. by a heater, while a predetermined temperature was being maintained, the conductivity of the solid electrolyte was measured, and the temperature dependency of the conductivity of the solid electrolyte was confirmed. The temperature dependency of the conductivity of the solid electrolyte is shown in FIG. 5. As shown in FIG. 5, the conductivity at a measurement temperature of 250° C. was $1.6 \times 10^{-6}$ S/cm and proton conductivity by exchanged proton became apparent. That is, the complex oxide obtained in the example can be used as an electrolyte of a fuel cell.

Example 2

Synthesis of Complex Oxide $Li_{1.64}H_{4.86}La_3Zr_{1.5}Ta_{0.5}O_{12}$

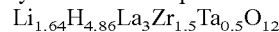

1 g of the raw material complex oxide $Li_{6.5}La_3Zr_{1.5}Ta_{0.5}O_{12}$ powder of Example 1 and 20 mL of pure water were put into a PTFE beaker having an internal volume of 100 mL and the beaker was set in a SUS pressure resistant vessel. The SUS pressure vessel was put into a dryer and held at a highest temperature of 120° C. for 24 hours. Thereafter, cooling was carried out, the product was washed with pure water, then only the powder was taken out. Then, the powder was dried in air at 60° C. to collect a powder sample of the dried complex oxide.

Figure 6:
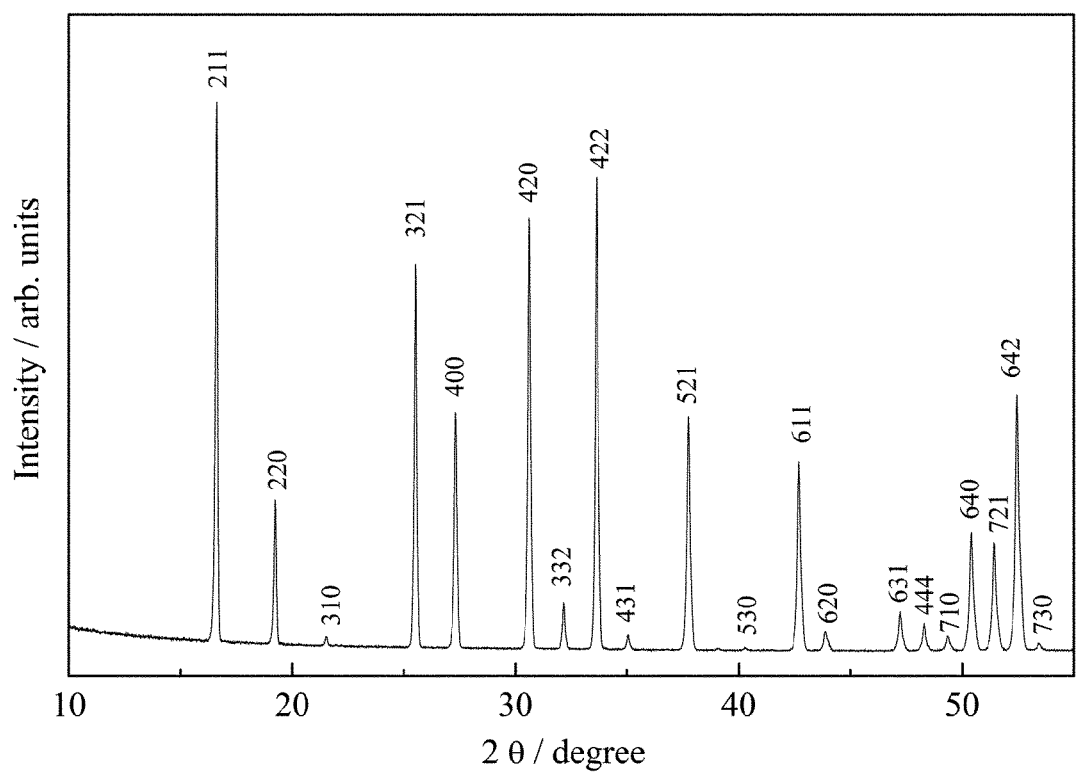
FIG. 6 is a powder X-ray chart of a complex oxide $Li_{1.64}H_{4.86}La_3Zr_{1.5}Ta_{0.5}O_{12}$ obtained in Example 2 that is indexed with a cubic system space group I-43d.

The crystal structure of the obtained complex oxide was investigated using a powder X-ray diffraction apparatus. It was confirmed that the complex oxide is a single phase of a garnet type structure having good crystallinity. The powder X-ray diffraction chart is shown in FIG. 6. As a result of carrying out refinement of the lattice constant of a cubic system which is the average structure by the least squares method, it was confirmed that the length of an a-axis of the cubic system is determined as 13.0411(1) Å and the complex oxide holds a garnet type structure from the lattice constant. In addition, as in the step of exchanging hydrogen of anhydrous ethanol and lithium of the raw material complex oxide of Example 1, also, in a step of exchanging hydrogen of water and lithium of the raw material complex oxide of the example, lanthanum hydroxide was not deposited.

In addition, as shown in FIG. 6, new peaks that are not able to be indexed with a known space group Ia-3d were observed near 22°, 41°, 49°, and 53°. These peaks can be respectively indexed by indexes 310, 530, 710, and 730 with a space group I-43d of the same cubic system. It was confirmed that the complex oxide obtained in the example has a new crystal structure which has not been reported.

Figure 7:
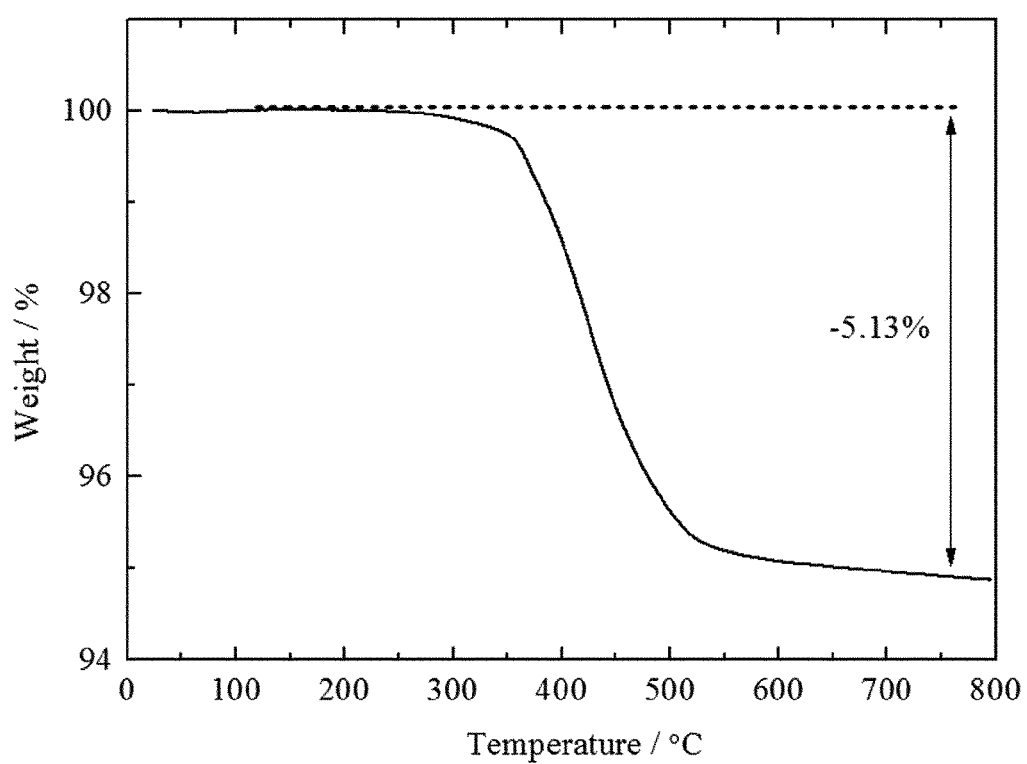
FIG. 7 is a graph showing a change in thermal weight of the complex oxide $Li_{1.64}H_{4.86}La_3Zr_{1.5}Ta_{0.5}O_{12}$ obtained in Example 2.

Next, as in Example 1, the thermal analysis of the complex oxide was carried out. The TG curve is shown in FIG. 7. A weight loss from 20° C. to 800° C. was 5.13 wt %. Assuming that the weight loss is the same as in the case of Example 1, the chemical formula of the complex oxide could be calculated as $Li_{1.64}H_{4.86}La_3Zr_{1.5}Ta_{0.5}O_{12}$. It was confirmed that although the treatment time was 24 hours, a large number of lithium ions included in the raw material complex oxide were exchanged for hydrogen in the synthesizing method of the example.

Example 3

Synthesis of Raw Material Complex Oxide $Li_{6.5}La_3Zr_{0.5}Nb_{0.5}O_{12}$

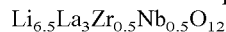

Figure 8:
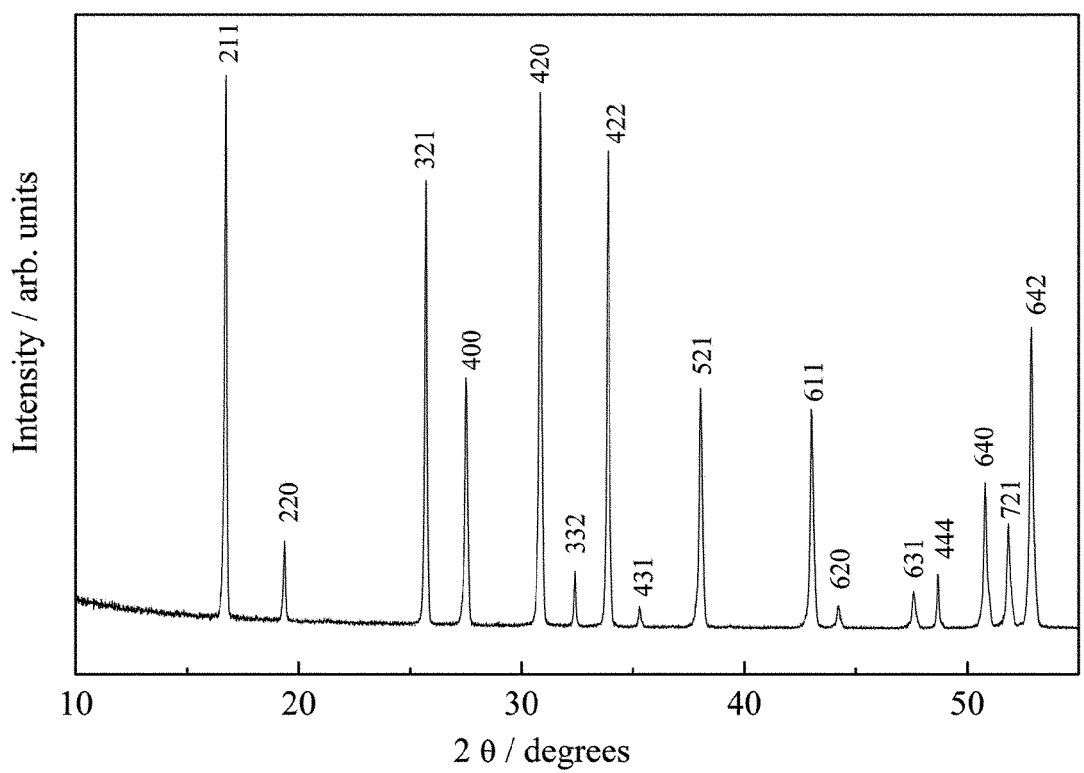
FIG. 8 is a powder X-ray diffraction chart of a raw material complex oxide $Li_{6.5}La_3Zr_{1.5}Nb_{0.5}O_{12}$ obtained in Example 3.

A raw material complex oxide $Li_{6.5}La_3Zr_{1.5}Nb_{0.5}O_{12}$ sample was obtained in the same manner as in Example 1 except that instead of using tantalum oxide, niobium oxide ($Nb_2O_5$, manufactured by RARE METALLIC Co., Ltd., purity: 99.99%) was used, and each raw material powder was weighed such that the substance amount ratio became Li:La:Zr:Nb=8.45:3:1.5:0.5. The crystal structure of the raw material complex oxide was investigated by using a powder X-ray diffraction apparatus. It was confirmed that the raw material complex oxide has good crystallinity and is a single phase of a garnet type structure belonging to a space group Ia-3d which is a known cubic system. The powder X-ray diffraction chart is shown in FIG. 8.

Synthesis of Complex Oxide $Li_{1.80}H_{4.70}La_3Zr_{1.5}Nb_{0.5}O_{12}$

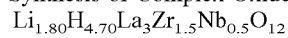

Figure 9:
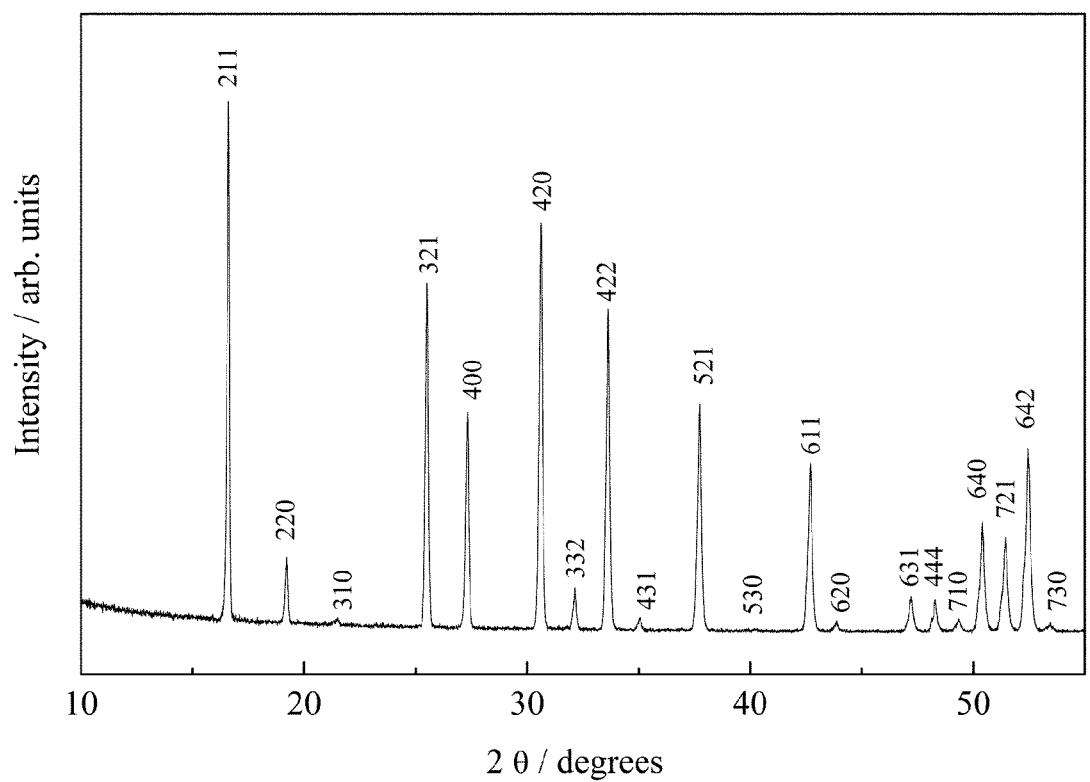
FIG. 9 is a powder X-ray diffraction chart of a complex oxide $Li_{1.80}H_{4.70}La_3Zr_{1.5}Nb_{0.5}O_{12}$ obtained in Example 3 that is indexed with a cubic system space group I-43d.

A powder sample of the complex oxide was obtained in the same manner as in Example 1 except that the raw material complex oxide $Li_{6.5}La_3Zr_{1.5}Nb_{0.5}O_{12}$ synthesized above was used. The crystal structure of the obtained complex oxide was investigated using a powder X-ray diffraction apparatus. It was confirmed that the complex oxide is a single phase of a garnet type structure having good crystallinity. The powder X-ray diffraction chart is shown in FIG. 9. As a result of carrying out refinement of the lattice constant of a cubic system which is the average structure by the least squares method, it was confirmed that the length of an a-axis of the cubic system is determined as 13.0447(3) Å and the complex oxide holds a garnet type structure from the lattice constant.

In addition, as shown in FIG. 9, new peaks that are not able to be indexed with a known space group Ia-3d were observed near 22°, 41°, 49°, and 53°. These peaks can be respectively indexed by indexes 310, 530, 710, and 730 with the space group I-43d of the same cubic system. It was confirmed that the complex oxide obtained in the example has a new crystal structure which has not been reported.

Figure 10:
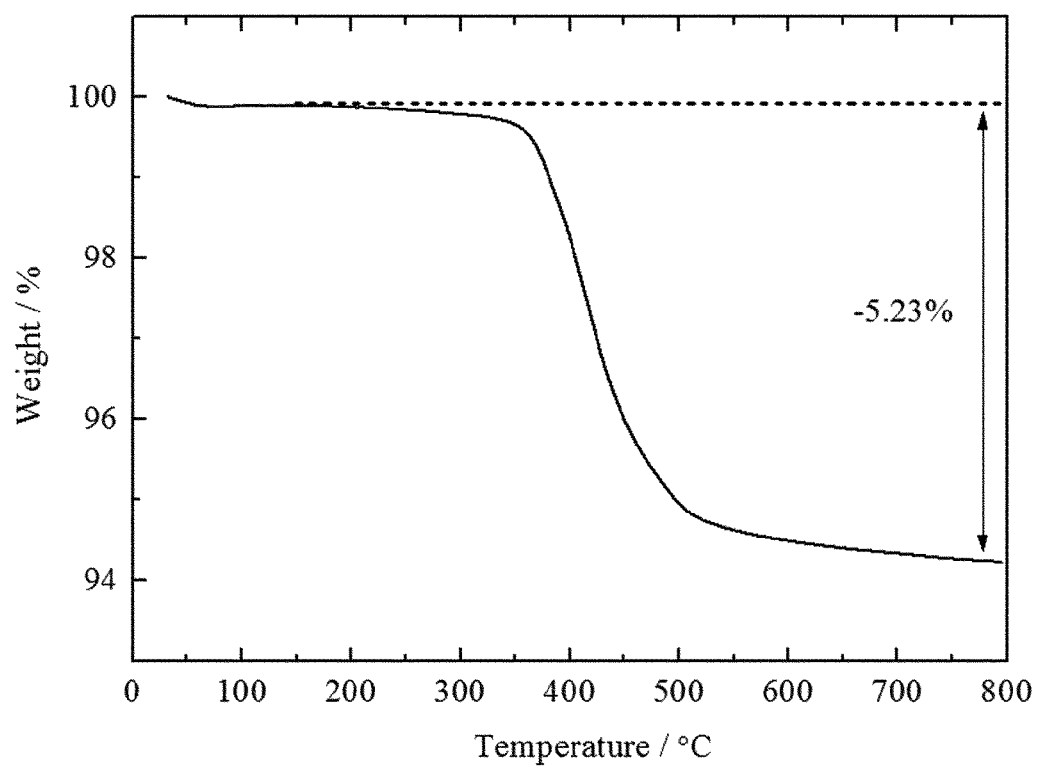
FIG. 10 is a graph showing a change in thermal weight of the complex oxide $Li_{1.80}H_{4.70}La_3Zr_{1.5}Nb_{0.5}O_{12}$ obtained in Example 3.

Next, as in Example 1, the thermal analysis of the complex oxide was carried out. The TG curve is shown in FIG. 10. A weight loss from 20° C. to 800° C. was 5.23 wt %. Assuming that the weight loss is the same as in the case of Example 1, the chemical formula of the complex oxide could be calculated as $Li_{1.80}H_{4.70}La_3Zr_{1.5}Nb_{0.5}O_{12}$. It was confirmed that a large number of lithium ions included in the raw material complex oxide were exchanged for hydrogen in the synthesizing method of the example.

Example 4

Synthesis of Complex Oxide $H_{6.5}La_3Zr_{1.5}Ta_{0.5}O_{12}$ 1 g of the raw material complex oxide $Li_{6.5}La_3Zr_{0.5}Ta_{0.5}O_{12}$ powder of Example 1, 20 mL of pure water, and 2 g of benzoic acid ($C_7H_6O_2$, manufactured by Wako Pure Chemical Industries, Ltd., purity: 99.5%) powder were put into a PTFE beaker having an internal volume of 100 mL, and the beaker was set in a SUS pressure vessel. The SUS pressure vessel was put into a dryer and held at a highest temperature of 200° C. for 24 hours. Thereafter, cooling was carried out, the resultant was washed with ethanol, and then only the powder was taken out. Then, the powder was dried in air at 60° C. to collect a powder sample of the complex oxide.

Figure 11:
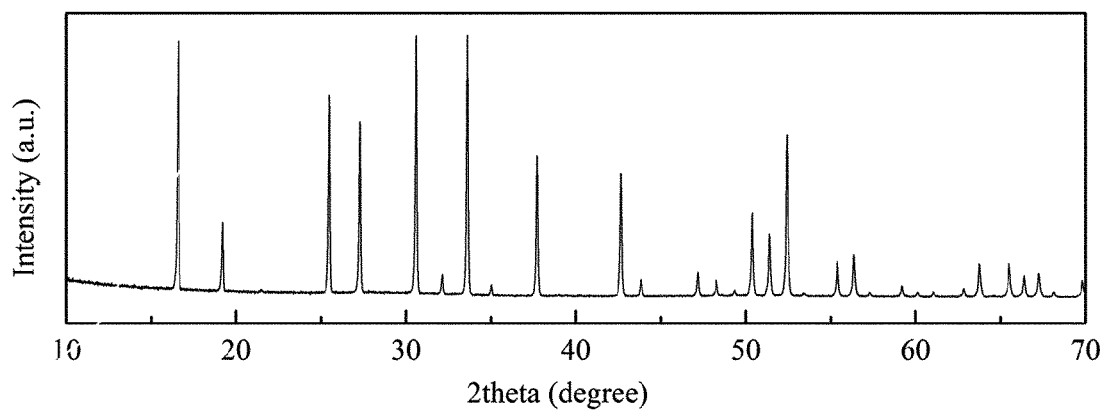
FIG. 11 is a powder X-ray diffraction chart of a complex oxide $H_{6.5}La_3Zr_{1.5}Ta_{0.5}O_{12}$ obtained in Example 4.

The crystal structure of the obtained complex oxide was investigated using a powder X-ray diffraction apparatus. It was confirmed that the complex oxide has good crystallinity and is a single phase of a garnet type structure belonging to a known tetragonal system. The powder X-ray diffraction chart is shown in FIG. 11. As shown in FIG. 11, in the chart of the complex oxide, compared to the chart of the raw material complex oxide (FIG. 2), tetragonal system peak separation does not occur and the crystal system is cubic. In addition, it was confirmed that the crystal structure of the complex oxide is not a space group Ia-3d but a space group I-43d since apparent peaks are observed near 22° and 53°. In addition, as a result of carrying out refinement of the lattice constant of a cubic system which is the average structure by the least squares method, the length of an a-axis of the cubic system was determined as 13.0439(1) Å.

Figure 12:
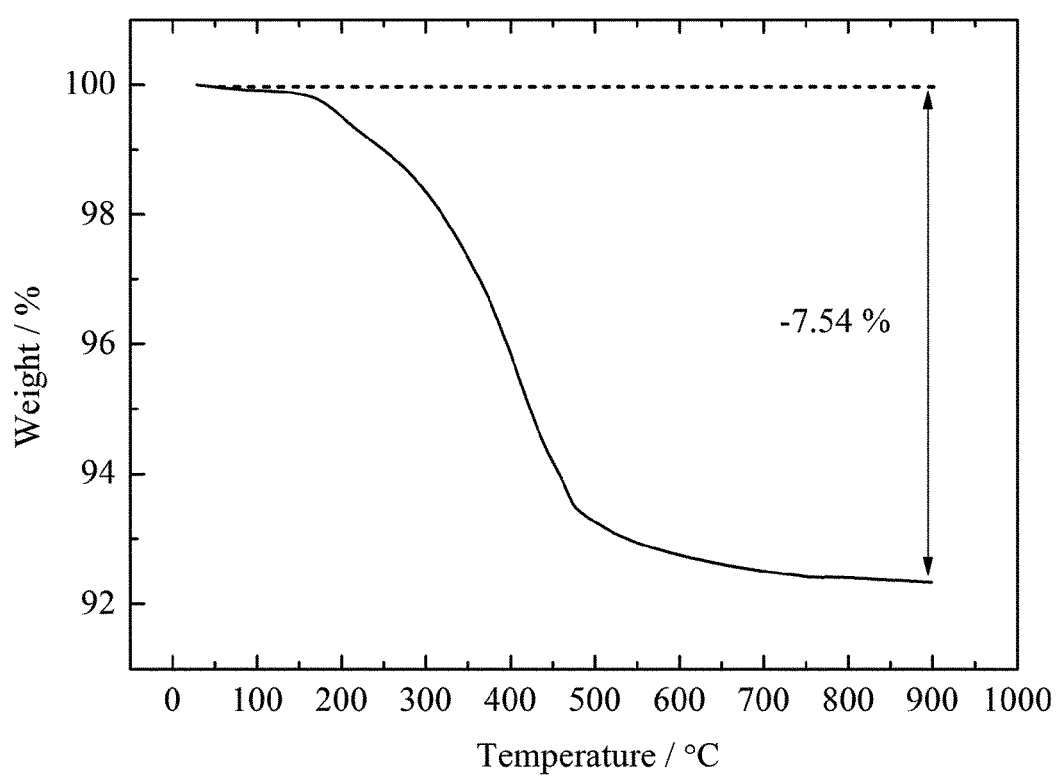
FIG. 12 is a graph showing a change in thermal weight of the complex oxide $H_{6.5}La_3Zr_{1.5}Ta_{0.5}O_{12}$ obtained in Example 4.

Next, as in Example 1, the thermal analysis of the complex oxide was carried out. The TG curve is shown in FIG. 12. A weight loss from 20° C. to 800° C. was 7.54 wt %. In a case where the hydrogen included in $H_{6.5}La_3Zr_{1.5}Ta_{0.5}O_{12}$ obtained by exchanging all lithium ions of the raw material complex oxide for hydrogen is volatilized in the form of $H_2O$, a calculated value of a weight loss is 6.94 wt %. The weight loss of 7.54 wt % of the complex oxide is more than the calculated value of 6.94 wt %. Therefore, the complex oxide can be calculated as $H_{6.5}La_3Zr_{1.5}Ta_{0.5}O_{12}$. It was confirmed that all lithium ions of the raw material complex oxide can be exchanged for hydrogen in the synthesizing method of the example.

Preparation of Complex Oxide $H_{6.5}La_3Zr_{1.5}Ta_{0.5}O_{12}$ Electrolyte

Further, a PTFE powder was mixed with 0.05 g of the complex oxide $H_{6.5}La_3Zr_{1.5}Ta_{0.5}O_{12}$ powder at a ratio of 4 wt % and pressure was applied at 60 MPa by a uniaxial press method to obtain a pellet-like composite film. The obtained composite film is a dense film-like pressed body having a diameter of 10 mm, a thickness of 0.25 mm, and a mass of 0.0474 g, and can be used as an electrolyte of a fuel cell.

Comparative Example 1

Synthesis of Complex Oxide $Li_{1.50}H_{5.50}La_3Zr_2O_{12}$ 1 g of a raw material complex oxide $Li_7La_3Zr_2{12}$ (manufactured by Kojundo Chemical Lab. Co., Ltd.) powder and 20 mL of pure water were put into a PTFE beaker having an internal volume of 100 mL, and the beaker was set in a SUS pressure resistant vessel. The SUS pressure resistant vessel was put into a dryer and held at a highest temperature of 120° C. for 24 hours. Thereafter, cooling was carried out, the resultant was washed with pure water, and then only the powder was taken out. Then, the powder was dried in air at 60° C. to collect a powder sample of the complex oxide.

The crystal structure of the complex oxide was investigated using a powder X-ray diffraction apparatus (trade name: RINT-2550V, manufactured by Rigaku Corporation).

Figure 13:
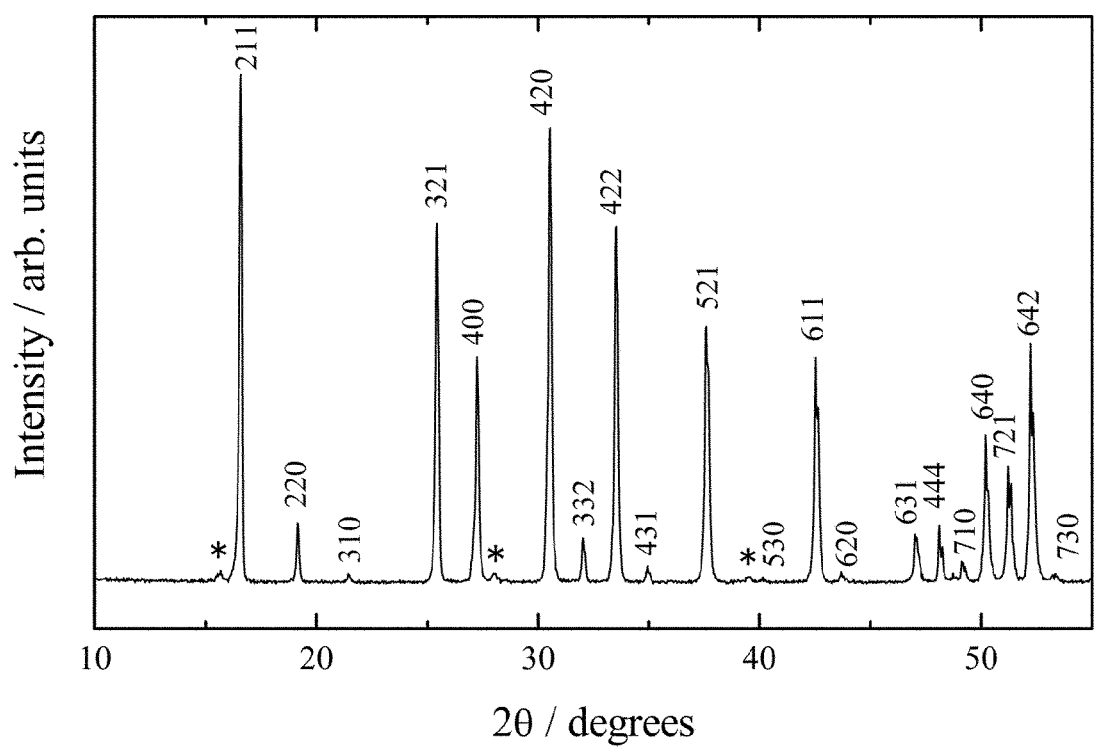
FIG. 13 is a powder X-ray diffraction chart of a complex oxide $Li_{1.50}H_{5.50}La_3Zr_2O_{12}$ obtained in Comparative Example 1.

It was confirmed that the complex oxide has good crystallinity and has a garnet type structure as a main phase. The powder X-ray diffraction chart is shown in FIG. 13. As shown in FIG. 13, in the chart of the complex oxide, compared to the chart of the raw material complex oxide, as the treatment temperature increases, tetragonal system peak separation does not occur and the crystal system is cubic. In addition, it was confirmed that the crystal structure of the complex oxide is not a space group Ia-3d but a space group I-43d since apparent peaks are observed near 22° and 53°.

However, impurity phase peaks were observed near 16°, 28°, and 39°. Among these, it was confirmed that the peak at 16° corresponds to lanthanum hydroxide. In a case where lithium of the raw material complex oxide $Li_7La_3Zr_2O_{12}$ was exchanged for hydrogen of water at an exchange temperature of 180° C., it was determined that the intensity of these impurity peaks is strong, and the decomposition reaction is advanced. On the other hand, in Example 2, although an exchange step was carried out under the same conditions as in the comparative example, impurities such as lanthanum hydroxide were not precipitated. By using a raw material complex oxide $Li_7La_3Zr_{2-y}M_yO_{12}$ (M represents Ta and/or Nb, and 0.25<y<2) in which some of Zr of the raw material complex oxide $Li_7La_3Zr_2O_{12}$ was substituted by tantalum and/or niobium, the chemical bond became strong and thus the effect of being capable of suppressing the decomposition reaction of the raw material complex oxide became clear.

Next, as in Example 1, the thermal analysis of the complex oxide was carried out. A weight loss from 20° C. to 800° C. was 6.20 wt %. Assuming that the weight loss is caused by volatilization of hydrogen included in the complex oxide in the form of $H_2O$, the chemical formula of the complex oxide could be calculated as $Li_{1.50}H_{5.50}La_3Zr_2O_{12}$. It was confirmed that although the complex oxide includes lanthanum hydroxide as an impurity, the exchange reaction of lithium and hydrogen is advanced.

Comparative Example 2

Synthesis of Raw Material Complex Oxide $Li_{6.75}La_3Zr_{1.75}Ta_{0.25}O_{12}$

Figure 14:
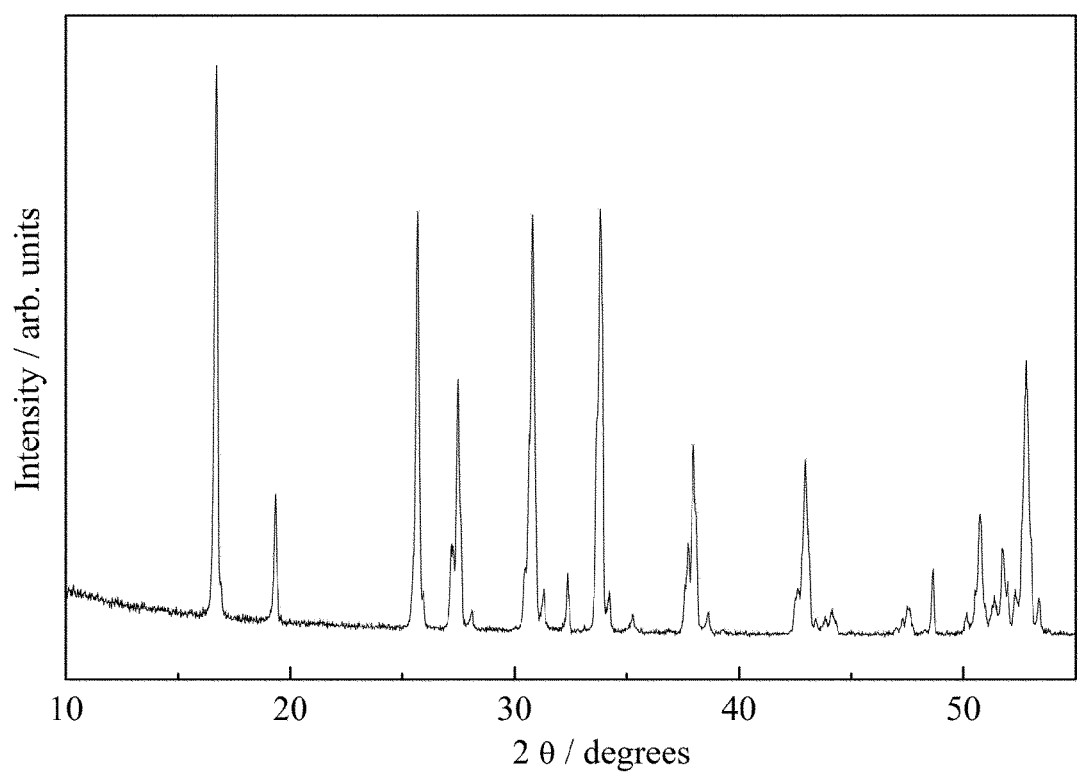
FIG. 14 is a powder X-ray diffraction chart of a raw material complex oxide $Li_{6.75}La_3Zr_{1.75}Ta_{0.25}O_{12}$ obtained in Comparative Example 2.

A raw material complex oxide $Li_{6.75}La_3Zr_{1.75}Ta_{0.25}O_{12}$ was obtained in the same manner as in Example 1 except that each raw material powder was weighed such that the substance amount ratio became Li:La:Zr:Ta=8.78:3:1.75:0.25. The crystal structure of the raw material complex oxide was investigated using a powder X-ray diffraction apparatus. It was confirmed that although the raw material complex oxide has good crystallinity, the raw material complex oxide is a mixture of two kinds of garnet type structure phases of known cubic system and tetragonal system. The powder X-ray diffraction chart is shown in FIG. 14.

As a result of the detailed analysis of the powder X-ray diffraction data, the phase of the raw material complex oxide was a mixed phase of cubic $Li_{6.5}La_3Zr_{1.5}Ta_{0.5}O_{12}$ phase and tetragonal $Li_7La_3Zr_2O_{12}$ phase. In the synthesizing method of the raw material complex oxide of the comparative example, since a firing vessel including aluminum is not used, aluminum and lithium are not substituted. Accordingly, it was found that in a case where aluminum is not substituted, a single phase of $Li_{6.75}La_3Zr_{1.75}Ta_{0.25}O_{12}$ cannot be formed.

Synthesis of Complex Oxide $Li_{6.75-x}$ 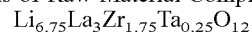$H_xLa_3Zr_{1.75}Ta_{0.25}O_{12}$ 1 g of a raw material complex oxide $Li_{6.75}La_3Zr_{1.75}Ta_{0.25}O_{12}$ powder as the mixture synthesized above and 20 mL of anhydrous ethanol were put into a PTFE beaker having an internal volume of 100 mL, and the beaker was set in a SUS pressure vessel. The SUS pressure vessel was put into a dryer and held at a highest temperature of 120° C. for 120 hours. Thereafter, cooling was carried out, the resultant was washed with ethanol, and then only the powder was taken out. Then, the powder was dried in air at 60° C. to collect a powder sample of the complex oxide.

Figure 15:
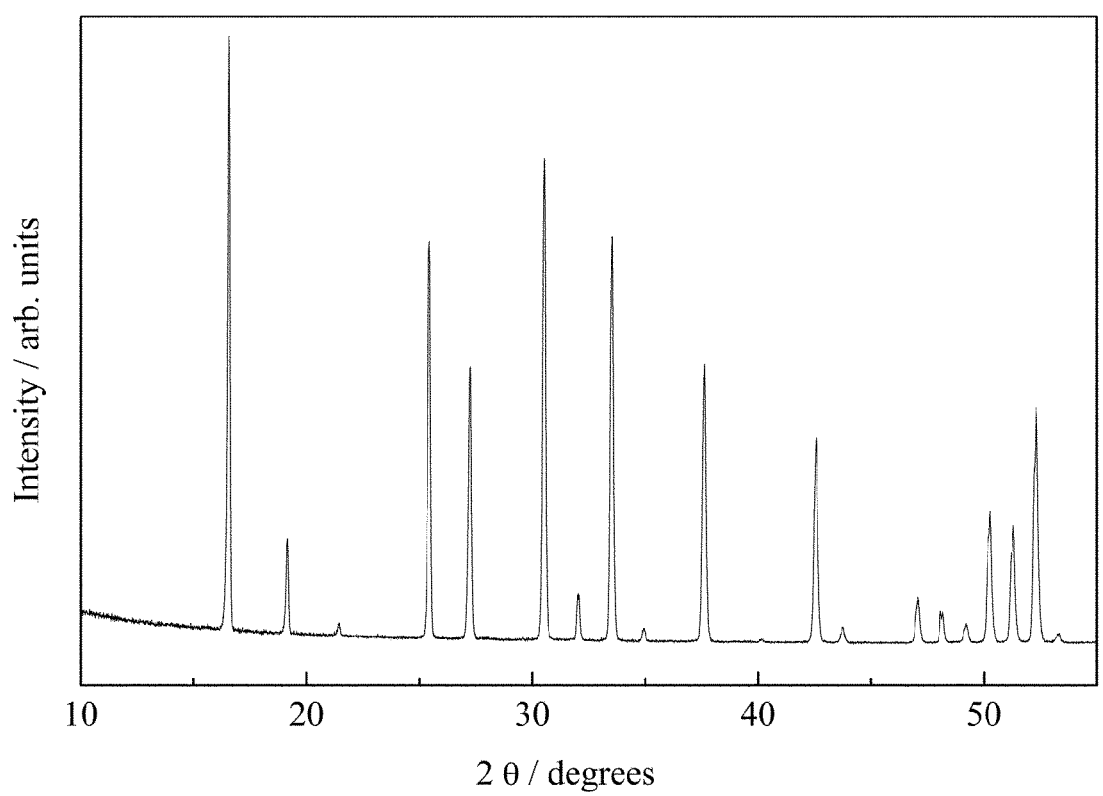
FIG. 15 is a powder X-ray diffraction chart of a complex oxide $Li_{6.75-x}H_xLa_3Zr_{1.75}Ta_{0.25}O_{12}$ sample obtained in Comparative Example 2.

The crystal structure of the complex oxide was investigated using a powder X-ray diffraction apparatus. It was confirmed that although the complex oxide has good crystallinity, the complex oxide is a mixture of two kinds of cubic garnet type structure phases. The powder X-ray diffraction chart is shown in FIG. 15. As a result of the structure analysis based on the powder X-ray diffraction data, it was found that the complex oxide is a mixed phase of $Li_{7-x}H_xLa_3Zr_2O_{12}$ phase and $Li_{6.5-x}H_xLa_3Zr_{1.5}Ta_{0.5}O_{12}$ phase both belonging to a cubic system space group I-43d.

INDUSTRIAL APPLICABILITY

The complex oxide of the present invention can be suitably used as an electrolyte material in a fuel cell of an intermediate temperature operation type fuel cell system or the like.

REFERENCE SIGNS LIST

1: cylindrical solid oxide fuel cell
2: fuel electrode
3: interconnector
4: electrolyte
5: air electrode

What is claimed is:
1. A method for producing a complex oxide, comprising:
an exchange step of bringing a raw material complex oxide represented by a chemical formula $Li_{7-x-y}H_xLa_3Zr_{2-y}M_yO_2$ (M represents Ta and/or Nb, $0 \leq x \leq 3.2$, and $0.25 < y < 2$) and a compound having a hydroxy group or a carboxy group into contact with each other to exchange at least some of lithium of the raw material complex oxide and hydrogen of the compound having a hydroxy group or a carboxy group,
wherein the complex oxide is represented by a chemical formula $Li_{7-x-y}H_xLa_3Zr_{2-y}M_yO_{12}$ (M represents Ta and/or Nb, $3.2 < x \leq 7-y$, and $0.25 < y < 2$) and is a single phase of a garnet type structure belonging to a cubic system,
wherein a crystal structure thereof is a space group I-43d.
2. The method for producing the complex oxide according to claim 1,
wherein the compound having a hydroxy group or a carboxy group is included in an acidic aqueous solution or is pure water or alcohol.
3. The method for producing the complex oxide according to claim 1,
wherein in the exchange step, the raw material complex oxide and the compound having a hydroxy group or a carboxy group are brought into contact with each other at a temperature of 80° C. to 200° C.
4. The method for producing the complex oxide according to claim 1,
wherein in the exchange step, the raw material complex oxide and the compound having a hydroxy group or a carboxy group are brought into contact with each other for 12 hours or longer.

* * * * *